United States Patent
Claptien et al.

(10) Patent No.: US 9,988,546 B2
(45) Date of Patent: Jun. 5, 2018

(54) COLOUR PENCIL LEAD

(71) Applicant: CONTE, Boulogne-sur-Mer (FR)

(72) Inventors: Frédéric D. Claptien, Samer (FR); Julien Gouerec, Boulogne (FR); Philippe Lefebvre, Wimereux (FR)

(73) Assignee: CONTE, Boulogne-sur-Mer (FR)

(*) Notice: Subject to any disclaimer, the term of this patent is extended or adjusted under 35 U.S.C. 154(b) by 0 days. days.

(21) Appl. No.: 15/537,021

(22) PCT Filed: Dec. 14, 2015

(86) PCT No.: PCT/FR2015/053469
§ 371 (c)(1),
(2) Date: Jun. 16, 2017

(87) PCT Pub. No.: WO2016/097555
PCT Pub. Date: Jun. 23, 2016

(65) Prior Publication Data
US 2017/0349775 A1  Dec. 7, 2017

(30) Foreign Application Priority Data
Dec. 17, 2014 (FR) .................................. 14 62665

(51) Int. Cl.
*C09D 13/00* (2006.01)
*B43K 19/02* (2006.01)
*B43K 19/18* (2006.01)

(52) U.S. Cl.
CPC .............. *C09D 13/00* (2013.01); *B43K 19/02* (2013.01); *B43K 19/18* (2013.01)

(58) Field of Classification Search
CPC .................................. C09D 13/00; B43K 19/02
See application file for complete search history.

(56) References Cited

U.S. PATENT DOCUMENTS

| 3,409,574 A | * | 11/1968 | Gros | ..................... | C09D 13/00 |
| | | | | | 106/31.09 |
| 6,572,295 B1 | | 6/2003 | Chochoy et al. | | |
| 2013/0338257 A1 | * | 12/2013 | Liu | ........................ | B43K 19/00 |
| | | | | | 523/164 |

FOREIGN PATENT DOCUMENTS

| CA | 2062381 | 2/1995 |
| EP | 2520442 A1 | 11/2012 |
| FR | 2674179 | 9/1992 |
| WO | 00/00557 | 1/2000 |
| WO | 01/43987 | 6/2001 |

OTHER PUBLICATIONS

International Search Report dated Apr. 28, 2016 from corresponding PCT International Application PCT/FR2015/053469, 2 pages.

* cited by examiner

*Primary Examiner* — Vu A Nguyen
(74) *Attorney, Agent, or Firm* — Ohlandt, Greeley, Ruggiero & Perle, L.L.P.

(57) ABSTRACT

The present invention concerns an extrudable, unexpanded color pencil lead, comprising, by weight relative to the total weight of the lead: between 25 and 45%, and advantageously between 30 and 40%, of a polyolefin; between 25 and 50%, and advantageously between 30 and 40%, of a colorless mineral filler; between 4 and 20%, and advantageously between 5 and 15%, of a pigment coated with or mixed with a polyolefin wax; between 0 and 10%, and advantageously between 2 and 10%, of an additive, and between 10 and 30%, and advantageously between 15 and 25%, of stearate chosen from magnesium stearate, calcium stearate and the mixture of same. It further concerns the color pencil comprising a lead according to the invention.

18 Claims, No Drawings

COLOUR PENCIL LEAD

The present invention relates to polymer-based leads for extrudable color pencils having improved erasability.

It is difficult to manufacture color pencil leads that have good erasability. The reason for this is that, in general, leads that are easy to erase do not have satisfactory color intensity between the mark left on the support and the support. Patent application WO 00/00557 attempts to solve this problem by using a fibrillatable or fibrillated material and by avoiding the use of waxes or of wax-like materials such as stearates which adhere and withstand removal from paper fibers. However, the composition thus obtained is difficult to use. In addition, the lead thus obtained has a high manufacturing cost, produces a discontinuous deposit on paper, which is linked to the very high cohesion of the mixture, and lacks softness.

It is thus necessary to find a new way of solving the problem of obtaining leads with improved erasability, without this lead encountering the problems of the prior art.

Now, the inventors have discovered, surprisingly, that it is possible to obtain such a lead by using astutely chosen proportions of pigment coated or mixed with a polyolefin wax, of colorless mineral filler, of magnesium and/or calcium stearate and of polyolefin.

U.S. Pat. No. 3,409,574 describes in its example 7 a color pencil lead comprising polyethylene, paraffin wax, microcrystalline wax, calcium stearate, a pigment and a mineral filler (talc, kaolin). However, said composition does not comprise any polyolefin wax and in particular any pigment coated or mixed beforehand with a polyolefin wax before its incorporation into the composition, which will have a negative impact on the erasability. In addition, the composition always comprises a plasticizer.

Now, the softness on paper is better with a pigment coated with a polyolefin wax rather than with a polyolefin. Moreover, the dispersion in the mixture and thus the homogeneity and the vivacity of the shade are better with the use of a polyolefin wax coating.

The present invention thus relates to a non-expanded, extrudable color pencil lead comprising, advantageously being constituted by, on a weight basis relative to the total weight of the lead:
  between 25 and 45%, advantageously between 30 and 40%, of a polyolefin;
  between 25 and 50%, advantageously between 30 and 40%, of a colorless mineral filler;
  between 5 and 20%, advantageously between 5 and 15%, of a pigment coated or mixed with a polyolefin wax;
  between 0 and 10%, advantageously between 3 and 10%, of an additive and
  between 10 and 30%, advantageously between 15 and 25%, of stearate chosen from magnesium stearate, calcium stearate, and a mixture thereof.

Such a color pencil lead has the advantage of good erasability and satisfactory color intensity, while at the same time maintaining sufficient mechanical properties to prevent the lead from breaking during its use or when it is sharpened.

The lead according to the present invention thus falls within the category of polymer-based, in this instance polyolefin-based, color pencil leads.

The lead according to the present invention is extrudable, i.e. it can be obtained by extrusion. It is advantageously extruded.

The lead according to the present invention is non-expanded. Thus, no expansion agent is used during its manufacturing process. In addition, the polyolefin used is not expanded.

The lead according to the present invention is a color pencil lead, i.e. it is intended to be used in color pencils, in particular in color pencils coated with wood or with synthetic wood material, optionally comprising a protective intermediate layer, in particular as described in patent application WO 01/43987.

The color pencil lead according to the present invention comprises between 25 and 45% by weight of a polyolefin relative to the total weight of the lead, advantageously between 30 and 40% by weight of a polyolefin relative to the total weight of the lead, more advantageously between 31 and 37% by weight of a polyolefin relative to the total weight of the lead, even more advantageously between 32 and 36% by weight of a polyolefin relative to the total weight of the lead.

The polyolefin is the main polymer of the lead. Even more advantageously, the lead does not comprise any other polymers. Advantageously, the polyolefin may be polyethylene or polypropylene; in particular, it is polypropylene, more particularly polypropylene homopolymer.

The polyolefin makes the lead extrudable and gives it good flexural strength mechanical properties.

The color pencil lead according to the present invention furthermore comprises between 25 and 50% by weight of a colorless mineral filler relative to the total weight of the lead, advantageously between 30 and 40% by weight of a colorless mineral filler relative to the total weight of the lead, more advantageously between 31 and 38% by weight of a colorless mineral filler relative to the total weight of the lead, even more advantageously between 33 and 37% by weight of a colorless mineral filler relative to the total weight of the lead.

In an advantageous embodiment, the colorless mineral filler is chosen from a clay, talc, boron nitride, silica, calcium carbonate, mica, steatite powder, and mixtures thereof. Advantageously, it is a lamellar colorless mineral filler, more particularly chosen from a clay, boron nitride, mica and/or talc, for example a clay chosen in particular from montmorillonite, bentonite and kaolin. More particularly, it is kaolin, in particular kaolin with a mass-based particle size D50 measured by sedimentation, for example using a Sedigraph® machine from the company Micromeritics, of between 2 and 5 μm.

Silica and talc have the role of giving the lead mechanical properties, such as flexural strength and/or breaking strength. The lamellar mineral fillers have the role of giving softness during writing and of maintaining a structure which erodes on paper like graphite leaflets.

The color pencil lead according to the present invention also comprises between 4 and 20% by weight of a pigment coated with or mixed with a polyolefin wax relative to the total weight of the lead, advantageously between 5 and 15% by weight of a pigment coated with or mixed with a polyolefin wax relative to the total weight of the lead, more advantageously between 5.5 and 13% by weight of a pigment coated with or mixed with a polyolefin wax relative to the total weight of the lead, even more advantageously between 5.5 and 10% by weight of a pigment coated with or mixed with a polyolefin wax relative to the total weight of the lead.

The pigment or the pigment mixture used may thus be coated or mixed with a polyolefin wax (for example in the form of a masterbatch, a pigmentary preparation or a dispersion of pigment in a polyolefin wax).

The pigment gives the lead color, whereas the polyolefin wax improves the erasability since it prevents the pigment from penetrating the support on which the mark is made with the lead according to the present invention. The pigment is thus coated or mixed beforehand with a polyolefin wax, before being added to the lead composition, this composition itself comprising a polyolefin.

Advantageously, the polyolefin of the polyolefin wax is polypropylene or polyethylene or a mixture thereof; it is advantageously polyethylene, for example low-density polyethylene.

In a particular embodiment, the pigment content of the pigment coated with or mixed with a polyolefin wax is between 25 and 65% by weight, advantageously between 30 and 60% by weight, relative to the total weight of the pigment coated with or mixed with a polyolefin wax.

In a particularly advantageous embodiment, the pigment used in the lead according to the present invention is pigment coated with a polyolefin wax. Advantageously, in this case, the pigment content of the pigment coated with a polyolefin wax is between 40 and 65% by weight relative to the total weight of the pigment coated with a polyolefin wax, advantageously between 50 and 60% by weight relative to the total weight of the pigment coated with a polyolefin wax.

Advantageously, the polyolefin wax is a polypropylene or polyethylene wax or a mixture thereof; it is advantageously a polyethylene wax, for example low-density polyethylene.

Depending on the desired color of the lead, the pigment is a red, black, yellow, orange, blue, magenta or violet pigment, and mixtures thereof.

Advantageously, the pigment coated with a polyolefin wax is commercially available from the company SunChemical under the name Sunfast® PE Flush Black L47-9000, Flush Rouge 48:2 L34-1209, Flush Jaune 14 L74-1357, Flush Bleu 15/3 L49-0714, Flush Violet 23 L46-4568, Orange Predisol L76P282, Predisol Magenta 122 L28P213, and mixtures thereof.

The color pencil lead according to the present invention also comprises stearate chosen from magnesium stearate, calcium stearate and a mixture thereof, in particular calcium stearate, in a content of between 10 and 30% by weight relative to the total weight of the lead, advantageously between 15 and 25% by weight relative to the total weight of the lead, more advantageously in a content of between 17 and 20% by weight relative to the total weight of the lead.

Calcium or magnesium stearate affords softness and glidance on paper.

The color pencil lead according to the present invention may comprise an additive, in a content of between 0 and 10% by weight relative to the total weight of the lead, advantageously between 2 and 10% by weight relative to the total weight of the lead, more advantageously in a content of between 3 and 8% by weight relative to the total weight of the lead.

This additive may be chosen from additives that are well known to those skilled in the art in the field of color pencil leads, in particular from glidants, processing agents, coupling agents, other pigments (i.e. pigments not mixed or coated with a polyolefin wax), dispersants, lubricants, and mixtures thereof, advantageously from zinc stearate, an amide, in particular a stearamide such as ethylenebisstearamide, waxes, fatty acids, glycerols and derivatives thereof such as glycerol behenate, glycerol dibehenate, glycerol stearate and/or polyglycerol diisostearate, siloxane grafted onto polypropylene, rutile titanium, maleic anhydride-grafted polypropylene, and mixtures thereof, more advantageously zinc stearate, ethylenebisstearamide, rutile titanium, and mixtures thereof.

Advantageously, the lead according to the present invention comprises zinc stearate, in particular in a content of between 1 and 5% by weight, advantageously between 1.5 and 2.5% by weight, relative to the total weight of the lead. Zinc stearate is a processing agent for the lead according to the present invention. It improves the process of manufacturing by extrusion.

In another advantageous embodiment, the lead according to the present invention comprises an amide, in particular a stearamide such as ethylenebisstearamide, advantageously in a content of between 0.5 and 3% by weight, advantageously between 1 and 2.5% by weight, relative to the total weight of the lead. The amide aids the dispersion of the fillers in the composition and also has a slight positive effect on the glidance.

The lead according to the present invention may also comprise rutile titanium, advantageously in a content of between 0 and 6% by weight, more advantageously between 1 and 5% by weight, relative to the total weight of the lead. Rutile titanium affords color to the lead according to the present invention.

In a particularly advantageous embodiment, the color pencil lead according to the present invention does not comprise any plasticizer.

In another advantageous embodiment, the color pencil lead according to the present invention does not comprise any palm oil.

In another advantageous embodiment, the color pencil lead according to the present invention does not comprise any fibrillatable or fibrillated material as defined and described in patent application WO 00/00557.

In a particular embodiment of the present invention, the lead has a diameter of between 2 and 3.6 mm, and is advantageously a lead with a diameter of between 2.8 and 3.2 mm.

The lead according to the present invention may be manufactured via processes that are well known to those skilled in the art.

For example, all the components are mixed together and the mixture obtained is extruded at suitable temperatures. The lead obtained is then cooled.

The lead according to the present invention thus has sufficient color intensity while at the same time having good mechanical properties, in particular in terms of flexural strength and/or impact strength, and while having improved erasability. In addition, the lead produces a continuous deposit on paper and has a certain softness.

The present invention also relates to a color pencil comprising a lead according to the present invention, in particular a color pencil coated with wood or synthetic wood material, optionally comprising a protective intermediate layer, for example as described in patent application WO 01/43987.

Advantageously, the color pencil is obtained by coextrusion of the lead and of the synthetic wood material and optionally of the protective intermediate layer.

In particular, the synthetic wood material is based on styrene polymer and the protective intermediate layer also acts as an adhesion layer and may advantageously comprise a mixture of EVA and polystyrene.

Advantageously, the synthetic wood material is expanded, so as to have a density equivalent to that of natural wood.

Advantageously, the color pencil according to the present invention may have a hexagonal, round or triangular, advantageously round or hexagonal, cross section.

Advantageously, it may comprise an erasing means, such as an eraser, at the non-sharpened end of the pencil.

The invention will be understood more clearly on reading the description of the examples that follow, which are given as a nonlimiting guide.

EXAMPLE 1

The table below collates examples of lead compositions according to the present invention for obtaining the characteristics of improving the erasability, good color intensity and sufficient mechanical properties to be used in color pencils.

TABLE 1

| Composition (weight %)/example | No. 1 bistre | No. 2 Red | No. 3 Yellow | No. 4 black | No. 5 Saint-Michael green |
|---|---|---|---|---|---|
| Polypropylene | 34.4 | 34.4 | 33.4 | 33.3 | 33.4 |
| Kaolin | 35.3 | 35.3 | 34.1 | 34.3 | 34.1 |
| Calcium stearate | 19.3 | 19.3 | 18.7 | 18.6 | 18.7 |
| Pigment coated with polyethylene wax | 5.5 | 7 | 10 | 10 | 6 |
| Additive | 5.5 | 4 | 3.8 | 3.8 | 7.8 |
| Total | 100 | 100 | 100 | 100 | 100 |

The invention claimed is:

1. A non-expanded, extrudable color pencil lead, comprising, on a weight basis relative to the total weight of the lead:
   between 25 and 45% of a polyolefin;
   between 25 and 50% of a colorless mineral filler;
   between 4 and 20% of a pigment coated or mixed with a polyolefin wax;
   between 0 and 10% of an additive and
   between 10 and 30% of stearate selected from the group consisting of magnesium stearate, calcium stearate and a mixture thereof.

2. The color pencil lead as claimed in claim 1, wherein the polyolefin is polypropylene.

3. The color pencil lead as claimed in claim 1, wherein the colorless mineral filler is selected from the group consisting of a clay, talc, boron nitride, silica, calcium carbonate, mica, steatite powder, and mixtures thereof.

4. The color pencil lead as claimed in claim 3, wherein the colorless mineral filler is a lamellar mineral filler.

5. The color pencil lead as claimed in claim 1, wherein the pigment content of the pigment coated with or mixed with a polyolefin wax is between 25 and 65% relative to the total weight of the pigment coated with or mixed with a polyolefin wax.

6. The color pencil lead as claimed in claim 1, wherein the pigment is coated with a polyolefin wax.

7. The color pencil lead as claimed in claim 1, wherein the polyolefin wax is a polyethylene wax.

8. The color pencil lead as claimed in claim 1, wherein the additive is selected from the group consisting of glidants, processing agents, coupling agents, dispersants, lubricants, other pigments, and mixtures thereof.

9. The color pencil lead as claimed in claim 1, which does not comprise any plasticizer.

10. The color pencil lead as claimed in claim 1, which is extruded.

11. A color pencil comprising a lead as claimed in claim 1.

12. The color pencil lead as claimed in claim 1 which comprises, on a weight basis relative to the total weight of the lead:
   between 30 and 40% of a polyolefin;
   between 30 and 40% of a colorless mineral filler;
   between 5 and 15% of a pigment coated or mixed with a polyolefin wax;
   between 2 and 10% of an additive and
   between 15 and 25% of stearate selected from the group consisting of magnesium stearate, calcium stearate and a mixture thereof.

13. The color pencil lead as claimed in claim 3, wherein the colorless mineral filler is a clay.

14. The color pencil lead as claimed in claim 13, wherein the clay is selected from the group consisting of montmorillonite, bentonite and kaolin.

15. The color pencil lead as claimed in claim 14, wherein the clay is kaolin.

16. The color pencil lead as claimed in claim 5, wherein the pigment content of the pigment coated with or mixed with a polyolefin wax is between 30 and 60% by weight relative to the total weight of the pigment coated with or mixed with a polyolefin wax.

17. The color pencil lead as claimed in claim 6, wherein the pigment content of the pigment coated with a polyolefin wax is between 40 and 65% by weight relative to the total weight of the pigment coated with a polyolefin wax.

18. The color pencil lead as claimed in claim 8, wherein the additive is selected from the group consisting of zinc stearate, an amide, waxes, fatty acids, glycerols and derivatives thereof, siloxane grafted onto polypropylene, rutile titanium, maleic anhydride-grafted polypropylene, and mixtures thereof.

* * * * *